United States Patent Office 2,734,874
Patented Feb. 14, 1956

2,734,874

PREPARATION OF CATALYSTS OF VANADIUM OXIDE OR CHROMIUM OXIDE ON POROUS CARRIERS

Leonard C. Drake, Wenonah, and Robert L. Smith, Pitman, N. J., assignors to Socony Mobil Oil Company, Inc., a corporation of New York No Drawing. Application May 21, 1952,
Serial No. 289,206

10 Claims. (Cl. 252—461)

This invention relates to the preparation and use of impregnated porous materials and more particularly is directed to a method of catalyst preparation wherein a porous support is impregnated with an active catalytic material.

In the preparation of contact materials for vapor phase reactions, as exemplified by hydrocarbon conversion reactions, it is often desirable or essential to support the active catalytic material upon some inert or relatively inactive material of a porous nature characterized by an extensive surface area. Frequently, materials employed as catalysts do not lend themselves readily to methods of preparation by which extensive surfaces may be obtained. On the other hand, materials having the desired porosity and surface area may be entirely unsuitable as catalysts due to their chemical composition. By combination of the active catalytic material with a material having an extensive surface, it is possible to obtain a given catalyst in a form having the desired surface characteristics.

Catalysts comprising one or more metal oxides or metals supported on suitable carrier materials are used to promote many industrially important reactions such as the manufacture of sulfuric acid and the conversion of hydrocarbons, including isomerization, polymerization, alkylation, dehydrogenation, hydrogenation, cracking, reforming, desulfurization, cyclization, aromatization, and the like. In the past, the preparation of such supported catalysts has commonly involved either coprecipitation of the active material and the supporting material or addition of the active metal ingredient to the supporting material in the form of an aqueous solution of a salt which upon being heated decomposes to the desired metal oxide. In another conventional method, the active component is added to the support in the form of an aqueous solution and is then precipitated on or in the supporting material with an aqueous alkaline solution and the resulting supported metal oxide or hydroxide is dried.

The use of aqueous impregnating solutions in preparation of supported catalysts is often disadvantageous. Thus, when a dry silica or other inorganic oxide gel is employed as the support, there is a tendency for the gel support to shatter when brought into contact with aqueous solution with the resultant production of fines. The finished catalyst, it if contains a substantial amount of fines, may produce undesirable packing and channeling in converters in which it is used. Fines are especially undesirable with supports that consist of manufactured pellets of uniform size and shape. Another disadvantage of employing aqueous metal salt impregnating solutions is that upon drying of the resulting catalyst, acidic vapors are unavoidably evolved from the material, causing damage of the more sensitive supports and leading to corrosion of the drying equipment. Aqueous impregnating solutions are also undesirable when hydratable supports such as magnesia are employed.

It is a major object of this invention to overcome the aforesaid disadvantages inherent in the use of aqueous impregnating solutions for the preparation of supported catalysts. A further object is the provision of a convenient and inexpensive method for preparing catalytic composites comprising one or more metal oxides or metals supported on a suitable carrier material. A still further object is the elimination of the use of aqueous solutions in preparation of impregnated porous materials.

The above and other objects which will be apparent to those skilled in the art are achieved by the method of this invention. Broadly, the present invention comprises preparation of a catalyst by impregnating a carrier or supporting material with a metal acetylacetonate. In accordance with one specific embodiment of the invention, supported metal oxide catalysts are advantageously prepared by impregnating a suitable difficultly fusible or refractory porous carrier or support with a solution of a metal acetylacetonate in a non-aqueous solvent, particularly an organic solvent, and subsequently heating or igniting to remove the solvent and form the metal oxide in and on the surfaces of the carrier. It is also feasible to impregnate the carrier material by bringing the same into contact with a metal acetylacetonate in vapor phase, and thereafter heating the impregnated material to decompose the metal acetylacetonate with formation of the metal oxide.

It has thus been found, in accordance with the instant invention, that metal acetylacetonates provide an effective and useful source of desired metal ingredients for effecting impregnation of porous supports and that the resulting impregnated materials are catalytically active in promoting a wide variety of vapor phase reactions, depending upon the choice of metallic constituent and upon the conditions under which said reactions are carried out.

The metal acetylacetonates employed herein are ring type chelate compounds having both coordinate and electrovalent linkages. They are non-ionic, water-insoluble, and relatively thermally stable. They are soluble in organic solvents including hydrocarbons, such as benzene, toluene, xylene, etc.; alchohols, such as methyl, ethyl, propyl, amyl, isopropyl, etc.; aldehydes, such as acetaldehyde, propionaldehyde, etc.; ketones, such as acetone, methylethyl ketone, etc.; esters, such as methyl acetate, ethyl acetate, ethyl benzoate, etc.; acids, such as acetic acid benzoic acid, propionic acid, etc.; or mixtures of two or more of the above liquids. The metal acetylacetonates, for the most part, are capable of vaporization without decomposition, which permits impregnation of the porous support with metal acetylacetonate vapors. Upon heating to an elevated temperature, generally above 400° F., the metal acetylacetonates decompose with formation of the metal oxide. The metal acetylacetones may conveniently be prepared in accordance with well known procedures by reacting acetylacetone with a salt, oxide, or hydroxide of a metal whose acetylacetonate is desired. Due to the method of preparation, it is possible to produce very pure metal acetylacetonates, which is highly desirable since the possibility of foreign ions being introduced into the catalyst during the course of impregnation is thereby minimized.

In practice of the invention, a porous carrier material, such as activated aluminum oxide, silica gel, bauxite, or alumina gel having granules of the desired size and shape is impregnated with a metal acetylacetonate. The support or carrier may, in general, be any granular porous material that is capable of withstanding elevated temperatures up to about 1300° F. or higher and that is resistant to conditions which will prevail during regeneration of the catalyst with an oxygen-containing gas at an elevated temperature or other influences which will be encountered in use. Representative suitable carrier materials, in addition to those already mentioned, are diatomaceous earth, kaolin, china clay, pumice, magnesia, thoria, zirconia, activated carbon, kieselguhr, etc. These supports are not to be considered as being complete equivalents of each other. They may or may not possess catalytic activity of their own. It is to be noted, however, that all of these materials have little or slight activity as compared with the impregnated catalysts prepared according to the present invention. The principal value of the supports, accordingly, is in providing an extensive surface area of refractory material which will not fuse or sinter when exposed to high temperature conditions for a long period of time. It frequently happens that one type of support is better than others, depending upon the ratio of active catalyst and support found experimentally to be the best for the furtherance of a particular reaction so that it is not to be inferred that the supports can at all times be used interchangeably. The support or carrier, in the form of granules of desired size and shape, may, if desired, be heated before impregnation to expel volatile material and to increase its porosity. A preliminary chemical treatment of the support with a dilute acid or alkali solution may also, in some instances, be advantageous.

The carrier material may be massive in form but preferably is employed in the form of particles. The carrier granules may be of any desired size and shape. Granular particles within the range of 4 to 40 mesh are preferred. Irregularly shaped particles or pieces may be formed by suitably breaking up a dry mass of the porous support. More regular sizes and shapes may be obtained by tableting, molding, casting, or extruding the wet or wetted comminuted porous material. Where an inorganic oxide gel is employed as the support, the hydrosol used in preparation thereof is desirably allowed to set as droplets to a hydrogel in a static or turbulent water-immiscible liquid to product spheroidal contact particles of the bead type.

Impregnation of the support or carrier with metal acetylacetonate may be effected in various ways. Thus, the porous material may be dipped, immersed, sprayed or otherwise treated to absorb the metal acetylacetonate. As set forth hereinabove, one feasible method of impregnation involves contacting the porous material with metal acetylacetonate vapors. The catalysts may be so prepared by providing a bed of the desired adsorptive carrier material and passing vapors of metal acetylacetonate therethrough either alone or in admixture with an inert gas stream under controlled conditions. Another effective method consists in bringing the porous support into contact with an organic solvent solution of metal acetylacetonate of suitable concentration for a predetermined time. In such instance, excess liquid may be removed from the impregnated particles by any convenient means, such as by decantation, filtration, or evaporation. Recovery of the liquid is generally advisable from an economic standpoint. Incorporation of the organic solvent solution of metal acetylacetonate with the support may be facilitated by the use of vacuum to remove gas from pores of the granular support. Subsequent release of the vacuum causes the solution to be driven into the interstices of the support. Alternate heating and cooling may also be used to effect incorporation of the catalytic material into the support. The impregnated granules may be partially or wholly dried and re-impregnated and coated as many times as desired to increase the quantity of catalytic material incorporated with the carrier.

Where a solvent solution of metal acetylacetonate is used as the impregnating medium, the temperature at which impregnation is effected generally ranges from room temperature (60° F.) up to the boiling point of the solution at the pressure employed during impregnation. When impregnation is accomplished with vaporous metal acetylacetonate, the temperature may extend from the boiling point of the particular metal acetylacetonate used up to about 1000° F. In general, the lower the impregnation temperature, the higher is the concentration of impregnated metal acetylacetonate. A satisfactory temperature range for vaporous catalyst impregnation in accordance with the present invention is between about 300° F. and about 1000° F. The impregnation may, if desired, be executed under elevated or reduced pressures.

The amount of metal component incorporated in the porous support using the method described herein may vary over an extended range, depending upon the particular metal acetylacetonate used, the adsorptive capacity of the particular porous support employed, the temperature and pressure during impregnation, and upon the nature of the reaction in which the resultant composite is to be employed. Generally, the amount of active metal oxide deposited will be in the range of 0.1 to 10 per cent by weight and more usually between about 2 and about 10 per cent by weight. It is to be realized, however, that the amount of active deposited component may be outside of the above ranges consistent with the use to which it is subsequently subjected. The concentration of the impregnating solution used in any specific case will depend upon the solubility of the particular metal acetylacetonate at the temperature of the impregnation and upon the desired concentration of the metal constituent in the compound catalyst.

The procedure followed in drying or treating the impregnated material will vary, depending upon the chemical constitution of the compound catalyst. In general, the material is dried and/or calcined in air or stream or mixtures of the same at temperatures above 400° F. up to about 1200° F. or even higher in some cases, although, if desired, the drying and calcination may be effected in the use of catalyst incident to the high temperatures encountered in hydrocarbon conversion processes and regeneration of the catalyst to yield the metal oxide. The oxide may, of course, be reduced to the metal by subsequent treatment with a reducing agent such as hydrogen. Alternatively, the metal may be obtained directly by drying the impregnated material in hydrogen or other reducing atmosphere. It is also possible to convert the deposited metal oxide to a metal salt or other useful catalytic component by suitable chemical and thermal treatment. In the usual manner of operation, however, the impregnated material is heated or ignited, whereby the metal acetylacetonate is decomposed to produce the metal oxide. Thus, a solution of nickel acetylacetonate in benzene may be adsorbed upon a synthetic of natural porous catalyst support which is subsequently heated or ignited to remove the liquid and form nickel oxide in and on the surfaces of the support.

The metal acetylacetonate used for impregnation will, of course, depend on the reaction which it is desired to catalyze. Thus, for dehydrogenation catalysts, the active metal oxide component will generally consist of one or more oxides of one or more metals of groups III, IV, V, VI, and VIII of the periodic table. Oxides of metals of group VI are preferred for such purpose and in particular the oxides of chromium. Active cyclization catalysts are found among the compounds of metals of the left-hand columns of groups IV, V, and VI of the periodic table. Of these, the oxides of vanadium and the metals of left-hand column of group VI, namely, chromium, molybdenum, tungsten, and uranium, are the most active and are accordingly preferred. If desired, several metal oxides may be used in combination; for example, one or more relatively less active, infusible, difficultly reducible oxides may be incorporated in the catalyst to stabilize it against thermal shock or to modify its action. For such purposes, alumina, thoria, zirconia, titania, boria, silica, and magnesia are suitable.

Specific metals which may be incorporated as oxides, as the element metals upon reduction, or as sulfides or other suitable compounds upon chemical treatment in accordance with the present invention include beryllium, nickel, zinc, aluminum, magnesium, cobalt, iron, manganese, copper, cadmium, and the rare earths. It is understood that metal oxide or other metal component catalysts suitable for one purpose are often entirely unsuitable for some other purpose and hence that the particular metals chosen in any instance will depend upon the contemplated use of the resulting catalyst.

The impregnated catalysts, prepared as herein described, may be employed in a number of vapor phase reactions including those wherein metal or metal oxides are ordinarily employed. These reactions may include carbon-to-carbon cleavage, isomerization, cyclization, dehydrogenation, hydrogenation, and desulfurization reactions. In the case of higher boiling hydrocarbons, for example, there is a cleavage of long-chained carbon-to-carbon bonds. Isomerization reactions may occur whereby the lower boiling hydrocarbons formed tend to become more branch-chained. Also, hydro-aromatic hydrocarbons present in the oil undergoing decomposition or formed therein by cyclization of olefins may undergo dehydrogenation to form aromatic hydrocarbons, and hydrogen liberated in these reactions may combine with other olefins present during reaction to form paraffinic hydrocarbons. The latter reactions tend to occur at the lower operating temperatures whereas more unsaturated hydrocarbons, particularly olefins, are produced at the higher temperatures employed. The hydrocarbons produced are generally of a more branched chain structure than are those produced in thermal cracking treatment. The temperatures employed may be a temperature from about 700° F. to about 1150° F. and the pressure employed may be from about atmospheric to about 300 pounds per square inch.

The following specific examples will serve to illustrate the method of catalyst preparation described herein without limiting the same:

EXAMPLE 1

A silica gel support was impregnated with a 3 per cent benzene solution of vanadium acetylacetonate. The temperature of impregnation was about 80° F. and the time of impregnation was approximately 15 minutes. The impregnated silica was dried at 450° F. and impregnated again under the same conditions and once again dried at 450° F. The impregnation and drying were repeated a third time to yield a deposition of about 3 per cent by weight of $V_2O_5$. The catalyst was finished by calcining in air at 1000° F.

EXAMPLE 2

A catalyst similar to that of Example 1 was prepared except that a temperature of 1000° F. between impregnations was employed.

The catalysts of the above examples were evaluated as reforming catalysts by bringing a 100-milliliter sample of the catalyst into contact with a straight run naphtha of 39 octane number at 1040° F. and a liquid hourly space velocity of 1. The results obtained are set forth in the table below:

Table I

| Example No | 1 | 2 |
| --- | --- | --- |
| Calcination Temperature, °F | 450 | 1,000 |
| Reforming Activity: | | |
| Gas, Wt. percent | 13.6 | 12.9 |
| Coke, Wt. Percent | 13.3 | 13.6 |
| Gasoline, Wt. Percent | 73.1 | 73.5 |
| Octane Number CFRR Clear | 86 | 79 |

From the foregoing results, it will be seen that the vanadia-impregnated silica catalysts were effective in catalyzing desired reforming.

EXAMPLE 3

Chromium acetylacetonate was vaporized and the vapors were passed through a bed of alumina gel pellets having a particle size of approximately 4–8 mesh at 950° F. The weight ratio of chromium acetylacetonate employed to alumina gel support was about 1 to 5. After impregnation, the catalyst was calcined in air at 1000° F. and had a $Cr_2O_3$ content of 2.9 per cent by weight.

The resulting composite was tested as a cyclization catalyst by conducting n-heptane (15 milliliters) through a bed of the catalyst (14 grams) maintained at 900° F. using a liquid hour space velocity of 1. It was found that 8 mole per cent of toluene was produced and that 0.85 atom of carbon in coke per mole of toluene were formed.

EXAMPLE 4

An alumina gel support was impregnated with a 26.6 per cent benzene solution of chromium acetylacetonate at room temperature to deposit the equivalent of 3.7 per cent $Cr_2O_3$. The catalyst was thereafter calcined in air at 1000° F.

EXAMPLE 5

An alumina gel support identical with that used in preparation of the catalyst of Example 4 was impregnated with a 4.7 per cent aqueous solution of $CrO_3$ at room temperature to deposit the equivalent of 3.8 per cent $Cr_2O_3$. The catalyst was thereafter calcined in air at 1000° F.

The catalysts of Examples 4 and 5 were compared as to catalyst activity by evaluating 15-gram samples thereof in contact with a charge of 15 milliliters of n-heptane at 900° F. employing a liquid hourly space velocity of 1. The comparative results are set forth below:

Table II

| | | Activity | |
| --- | --- | --- | --- |
| Example | Catalyst | Mole percent Toluene Produced | Atoms, Carbon in Coke per Mole of Toluene Formed |
| 4 | 3.7% $Cr_2O_3$ from benzene solution of chromium acetylacetonate. | 24 | 0.83 |
| 5 | 3.8% $Cr_2O_3$ from a water solution of $CrO_3$. | 21 | 1.0 |

From the above data, it will be noted that the method in which the benzene solution of chromium acetylacetonate was employed produced a catalyst having a greater activity and giving appreciably less coke than a catalyst of substantially identical composition prepared using an aqueous chromic acid solution.

In some cases, it may be found desirable to add a metal acetylacetonate to the hydrocarbon charge stock for subsequent deposition of the metal oxide on the catalyst support. Such method can also be effectively employed in modifying or supplementing the catalyst already in contact with the hydrocarbon charge. It is also contemplated that volatilized metal acetylacetonate may be carried along in an inert gas stream for subsequent addition to the catalyst during the onstream, purge, or regeneration period of the catalytic run.

Although the processes described in the specific illustrative examples are directed to the production of catalysts comprising metal oxides, it is evident that the metal oxide component of the catalyst can be reduced by treating with hydrogen or other reducing agent. Also, it is to be noted that in many hydrocarbon conversion reactions, the metal oxide catalyst components may be reduced to the corresponding metals. It is also within the purview of the invention to treat the supported metal oxide catalyst chemically to convert the oxide to sulfide or other salt which may find use in catalytically promoting a particular reaction. Thus, the invention is directed to the preparation of supported catalysts in which the supported catalytic component comprises initially a metal oxide which may be subsequently converted, wholly or partially, to a metal or metal salt.

We claim:

1. A method for preparing a catalyst, which comprises adsorbing on a porous carrier at a temperature ranging from ambient temperature up to about 1000° F., but below the decomposition temperature, a sufficient quantity of a metal acetylacetonate from a non-aqueous medium to furnish, upon subsequent decomposition thereof, a catalytically active amount of a metal oxide deposited on said carrier and thereafter heating the carrier with adsorbed metal acetylacetonate for a sufficient time and at a sufficient temperature to convert said adsorbed metal acetylacetone to a deposit of metal oxide on said carrier.

2. A method for preparing a catalyst, which comprises impregnating a porous carrier at a temperature ranging from ambient temperature up to about 1000° F., but below the decomposition temperature, with a sufficient quantity of a metal acetylacetonate from a non-aqueous medium containing sufficient concentration of the same to furnish, upon subsequent decomposition thereof, a catalytically active amount of a metal oxide deposited on said carrier and thereafter employing the porous impregnated carrier in a catalytic operation carried out for a time and at a temperature sufficient to convert said acetylacetonate to metal oxide deposited on said carrier.

3. A method for preparing a catalyst, which comprises impregnating a porous carrier with a sufficient quantity of an organic solvent solution containing sufficient concentration of a metal acetylacetonate at a temperature ranging from ambient temperature up to the boiling point of said solution to furnish, upon subsequent decomposition of said metal acetylacetonate, a catalytically active amount of a metal oxide deposited on said carrier and thereafter drying and igniting the impregnated carrier for a sufficient time and at a sufficiently high temperature to effect removal of said solvent therefrom and to convert said metal acetylacetonate to metal oxide.

4. A method for preparing a catalyst, which comprises bringing a porous carrier into contact with sufficient quantity of vapors of a metal acetylacetonate at a temperature ranging from the boiling point of said metal acetylacetonate up to about 1000° F., but below the decomposition temperature thereof, to furnish, upon subsequent decomposition of said metal acetylacetonate, a catalytically active amount of a metal oxide deposited on said carrier and thereafter heating the carrier containing the metal acetylacetonate for a sufficient time and at a sufficient temperature to convert said metal acetylacetonate to metal oxide.

5. A method for preparing a catalyst, comprising an oxide of a metal of the left-hand column of group VI of the periodic table supported on a porous granular catalyst carrier, which comprises impregnating the porous granular catalyst carrier at a temperature ranging from ambient temperature up to about 1000° F., but below the decomposition temperature, with a sufficient quantity of an acetylacetonate of a metal of the left-hand column of group VI of the periodic table from a non-aqueous medium to furnish, upon subsequent decomposition thereof, a catalytically active amount of an oxide of said metal deposited on said carrier and thereafter heating the impregnated carrier for a sufficient time and at a sufficient temperature to convert said acetylacetonate to an oxide of said metal.

6. A method for preparing a catalyst, comprising an oxide of a metal of the left-hand column of group VI of the periodic table supported on a porous granular catalyst carrier, which comprises impregnating the porous granular catalyst carrier with a sufficient quantity of an organic solvent solution containing sufficient concentration of an acetylacetonate of a metal of the left-hand column of group VI of the periodic table at a temperature ranging from ambient temperature up to the boiling point of said solution to furnish, upon subsequent decomposition of said metal acetylacetonate, a catalytically active amount of an oxide of said metal deposited on said carrier, removing a substantial portion of the excess liquid from said carrier and thereafter heating the impregnated carrier for a sufficient time and at a sufficient temperature to convert said metal acetylacetonate to an oxide of said metal.

7. A method for preparing a catalyst, which comprises bringing a porous carrier into contact with vapors of an acetylacetonate of a metal of the left-hand column of group VI of the periodic table at a temperature ranging from the boiling point of said metal acetylacetonate up to about 1000° F., but below the decomposition temperature, under conditions such that the porous carrier is impregnated with sufficient quantity of said vapors to furnish, upon subsequent decomposition of said metal acetylacetonate, a catalytically active amount of an oxide of said metal deposited on said carrier and thereafter heating the carrier impregnated with an acetylacetonate of a metal of the left-hand column of group VI of the periodic table for a sufficient time and at a sufficient temperature to convert said metal acetylacetonate to an oxide of said metal.

8. A process for preparing a catalyst, comprising chromium oxide supported on a porous granular catalyst carrier, which comprises impregnating the porous granular catalyst carrier at a temperature ranging from ambient temperature up to about 1000° F., but below the decomposition temperature, with a sufficient quantity of chromium acetylacetonate from a non-aqueous medium containing sufficient concentration of the same to furnish, upon subsequent decomposition thereof, a catalytically active amount of chromium oxide deposited on said carrier and thereafter heating the impregnated carrier for a sufficient time and at a sufficient temperature to convert said chromium acetylacetonate to chromium oxide.

9. A process for preparing a catalyst, comprising vanadium oxide supported on a porous granular catalyst carrier, which comprises impregnating the porous granular catalyst carrier at a temperature ranging from ambient temperature up to about 1000° F., but below the decomposition temperature, with a usfficient quantity of vanadium acetylacetonate from a non-aqueous medium containing sufficient concentration of the same to furnish, upon subsequent decompoistion thereof, a catalytically active amount of vanadium oxide deposited on said carrier and thereafter heating the impregnated carrier for a sufficient time and a sufficient temperature to convert said vanadium acetylacetonate to vanadium oxide.

10. A method for preparing a catalyst, comprising chromium oxide supported on a porous granular catalyst carrier, wihch comprises impregnating the porous granular catalyst carrier with a sufficient quantity of an organic solvent solution containing sufficient concentration of chromium acetylacetonate at a temperature ranging from ambient temperature up to the boiling point of said solution to furnish, upon subsequent decomposition of said chromium acetylacetonate a catalytically active amount of chromium oxide deposited on said carrier and thereafter drying and igniting the impregnated carrier for a sufficient time and at a sufficiently high temperature to effect removal of said solvent therefrom and to convert said chromium acetylacetonate to chromium oxide.

References Cited in the file of this patent

UNITED STATES PATENTS

| | | |
|---|---|---|
| 1,558,162 | Hall | Oct. 20, 1925 |
| 1,789,538 | Beekley | Jan. 20, 1931 |
| 1,876,270 | Zorn | Sept. 6, 1932 |
| 1,895,522 | Punnett | Jan. 21, 1933 |
| 2,328,158 | Martin | Aug. 31, 1943 |
| 2,470,166 | Hetzel et al. | May 17, 1949 |

OTHER REFERENCES

Synthetic Organic Chemicals, Carbide and Carbons Chem. Co., New York, New York, 1945, page 57. (Copy in Div. 64.)